United States Patent
Emad et al.

(10) Patent No.: US 9,948,769 B2
(45) Date of Patent: Apr. 17, 2018

(54) METHODS AND SYSTEMS FOR DETERMINING CROSSTALK FOR A LINE IN A VECTORED SYSTEM

(71) Applicants: Amin Emad, Urbana, IL (US); Carl J. Nuzman, Union, NJ (US); Emina Soljanin, Green Village, NJ (US)

(72) Inventors: Amin Emad, Urbana, IL (US); Carl J. Nuzman, Union, NJ (US); Emina Soljanin, Green Village, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 477 days.

(21) Appl. No.: 14/669,167

(22) Filed: Mar. 26, 2015

(65) Prior Publication Data

US 2016/0286037 A1 Sep. 29, 2016

(51) Int. Cl.
| | | |
|---|---|---|
| H04M 1/76 | (2006.01) | |
| H04M 3/34 | (2006.01) | |
| H04M 11/06 | (2006.01) | |
| H04B 3/32 | (2006.01) | |
| H04M 1/64 | (2006.01) | |
| H04M 3/22 | (2006.01) | |

(52) U.S. Cl.
CPC .............. H04M 3/34 (2013.01); H04B 3/32 (2013.01); H04M 11/062 (2013.01); H04M 3/2209 (2013.01)

(58) Field of Classification Search
CPC .......... H04B 3/32; H04M 11/062; H04M 3/34
USPC ........................ 379/406.01–406.16, 414–417
See application file for complete search history.

(56) References Cited

U.S. PATENT DOCUMENTS

| | | | | |
|---|---|---|---|---|
| 6,999,583 B2 * | 2/2006 | Valenti | ...................... | H04L 1/24 370/201 |
| 7,548,599 B2 * | 6/2009 | Azadet | ...................... | H04B 3/32 370/201 |
| 8,717,864 B2 * | 5/2014 | Schenk | ...................... | H04B 3/32 370/201 |
| 2012/0195183 A1 * | 8/2012 | Nuzman | .................. | H04B 3/32 370/201 |

(Continued)

FOREIGN PATENT DOCUMENTS

EP  2955857 A1  12/2015

OTHER PUBLICATIONS

Self-FEXT cancellation (vectoring) for use with VDSL2 transceivers, Series G: Transmission Systems and Media, Digital Systems and Networks, ITU G.993.5, Apr. 2010, 80 pages.

*Primary Examiner* — Solomon Bezuayehu
(74) *Attorney, Agent, or Firm* — Harness, Dickey & Pierce, P.L.C.

(57) ABSTRACT

At least one example embodiment discloses a method of determining crosstalk for at least one first line in a communication system having a plurality of second lines. The method includes obtaining at least one pilot matrix representing a sequence of pilot signals and transmitting pilot signals across the plurality of second lines in accordance with the at least one pilot matrix. The method further includes obtaining measurement vectors for the at least one first line on a plurality of subcarriers, in response to the transmitted pilot signals, determining a weighted vector, the weighted vector being a weighted combination of the measurement vectors and determining a crosstalk coupling vector based on the determined weighted vector.

20 Claims, 6 Drawing Sheets

(56) References Cited

U.S. PATENT DOCUMENTS

| | | | | |
|---|---|---|---|---|
| 2012/0224685 A1* | 9/2012 | Schenk | ................ | H04B 1/7075 |
| | | | | 379/406.08 |
| 2013/0301824 A1* | 11/2013 | Defoort | ................... | H04B 3/32 |
| | | | | 379/406.01 |
| 2014/0205082 A1* | 7/2014 | Nuzman | ................... | H04B 3/32 |
| | | | | 379/406.06 |
| 2014/0233710 A1* | 8/2014 | Tu | ........................... | H04B 3/32 |
| | | | | 379/32.04 |
| 2015/0350415 A1* | 12/2015 | Nuzman | ................ | H04M 3/34 |
| | | | | 379/406.01 |

\* cited by examiner

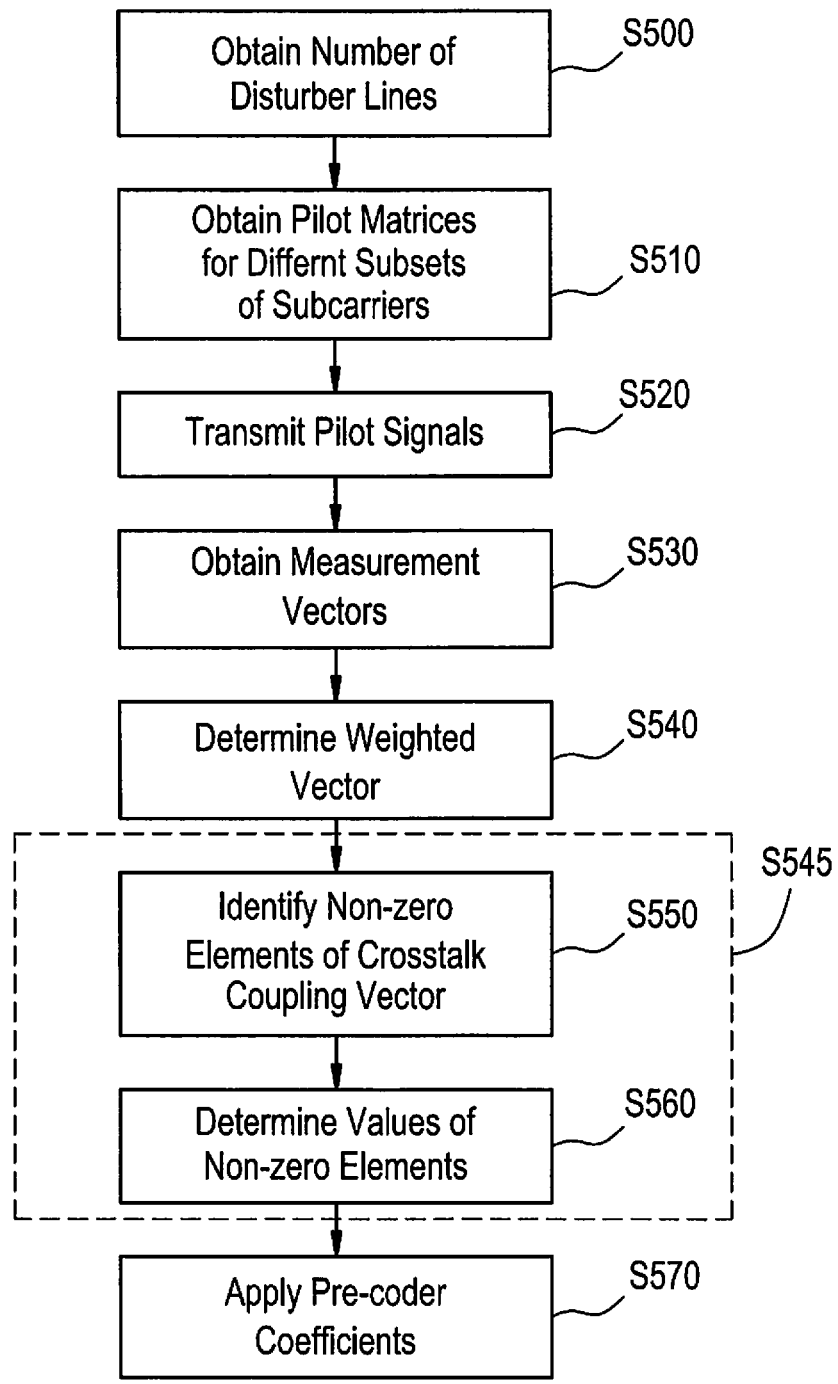

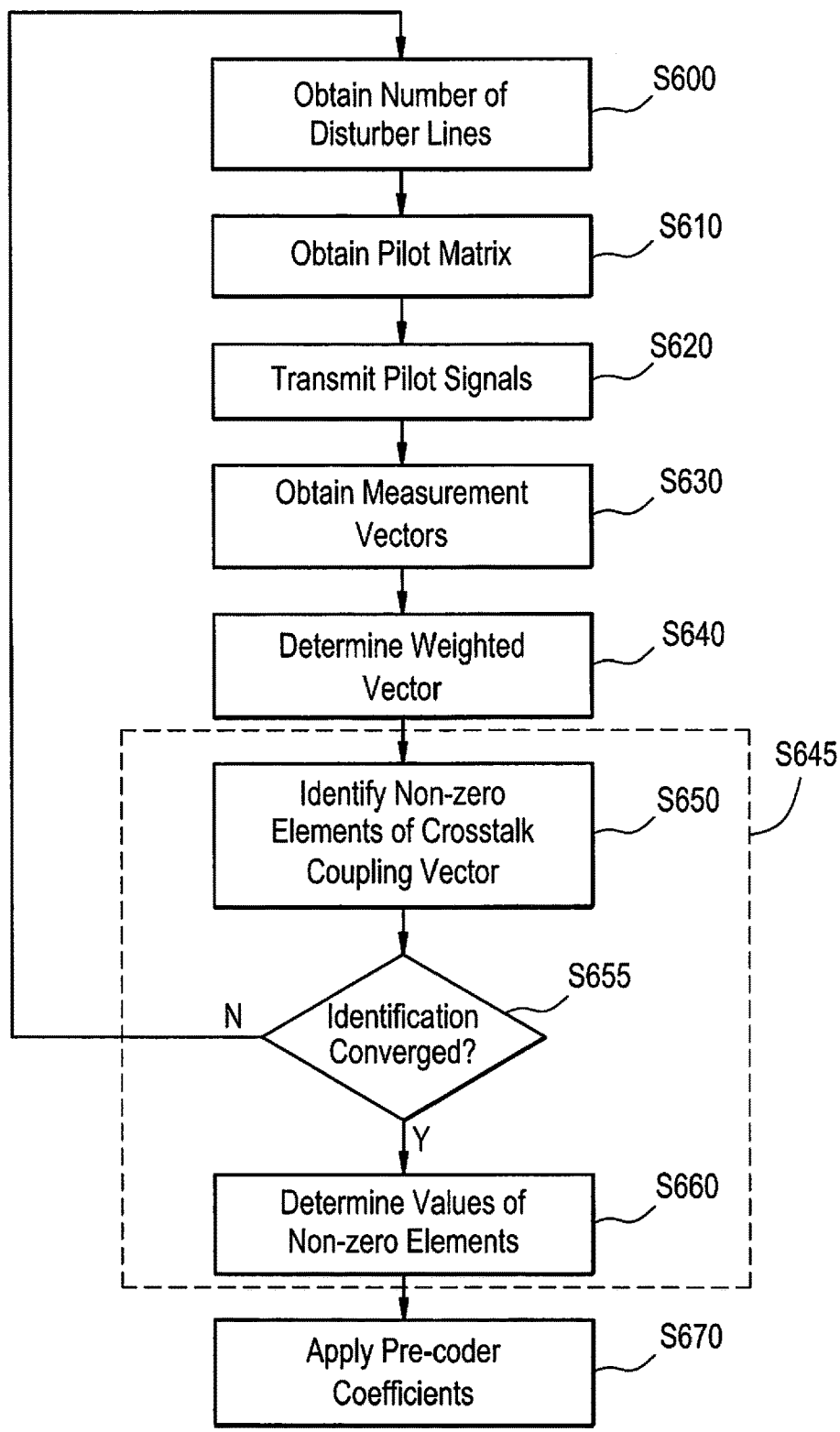

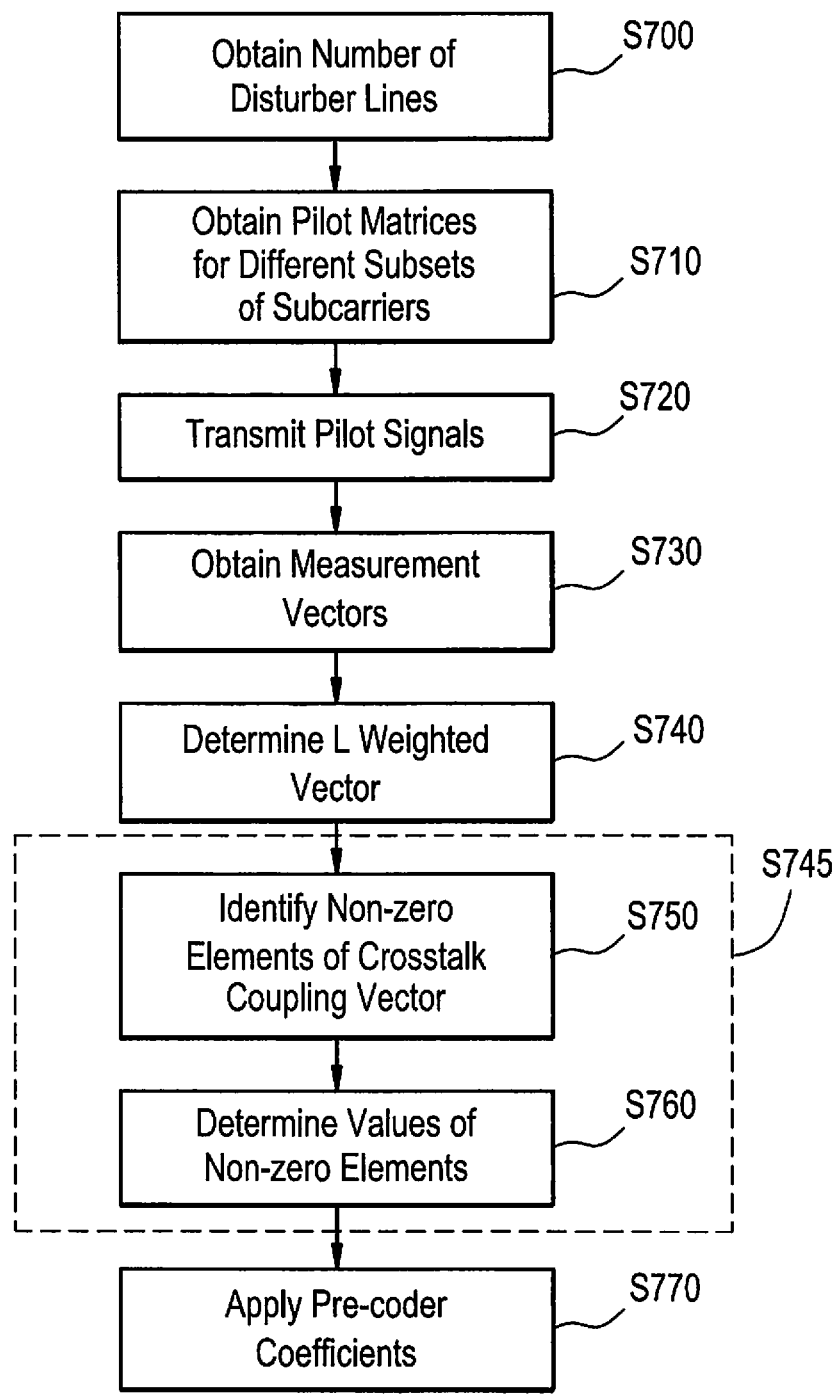

METHODS AND SYSTEMS FOR DETERMINING CROSSTALK FOR A LINE IN A VECTORED SYSTEM

BACKGROUND

Performance of a digital subscriber line (DSL) in terms of capacity depends on a number of factors such as attenuation and a noise environment. Performance of a DSL transmission system is impacted by crosstalk interference from one twisted line pair to another twisted line pair with the same binder and, to a lesser extent, twisted line pairs in neighboring binders.

Consequently, crosstalk interference may affect data rates across a number of twisted pair lines.

For instance two communication lines such as two VDSL2 lines which are collocated next to each other induce a signal in each other. Due to the induced crosstalk and noise from other sources in the surroundings of the communication line, the data transported on these lines may be affected or corrupted by the crosstalk and noise. By reducing the crosstalk induced on a communication line or compensating the crosstalk induced on a communication line, the amount of corrupted data may be reduced and the rate at which information can be reliably communicated is increased.

Each communication line is a possible disturber line which induces crosstalk in one or more victim lines. Moreover, in today's systems, the number of active communication lines may vary. Thus, the induced crosstalk varies as the number of active communication lines vary.

When a communication line joins, an initialization process establishes a communication session over a given line. Typically, the initialization process occurs when a number of other lines are already carrying active communication sessions.

In order for the new communication session to start with a maximum rate possible, the coefficients of crosstalk channels from active lines into the new joining line are determined. This can be accomplished by sending pilot signals on all lines, and observing the resulting received signal at the receiver of the new line.

G.vector uses mutually orthogonal pilots and correlation as described in "Self-FEXT cancellation (vectoring) for use with VDSL2 transceivers," *Series G: Transmission Systems and Media, Digital Systems and Networks, ITU G.*993.5, April 2010, the entire contents of which is incorporated by reference.

SUMMARY

The inventors have discovered methods and systems to reduce an initialization time of a joining line in a communication system, such as a vectored DSL system.

In one example embodiment, a method of determining crosstalk for at least one first line in a communication system having a plurality of second lines is disclosed. The method includes obtaining at least one pilot matrix representing a sequence of pilot signals and transmitting pilot signals across the plurality of second lines in accordance with the at least one pilot matrix. The method further includes obtaining measurement vectors for the at least one first line on a plurality of subcarriers, in response to the transmitted pilot signals, determining a weighted vector, the weighted vector being a weighted combination of the measurement vectors and determining a crosstalk coupling vector based on the determined weighted vector.

In an example embodiment, the determining the weighted vector includes determining a noise variance of each of the plurality of subcarriers, and determining the weighted vector based on the determined noise variance of each of the plurality of sub carriers.

In an example embodiment, the method further includes identifying non-zero elements of the crosstalk coupling vector based on the determined weighted vector, wherein the determining the crosstalk coupling vector determines values of the identified non-zero elements of the crosstalk coupling vector.

In an example embodiment, the identifying identifies the non-zero elements of the crosstalk coupling vector using an orthogonal matching pursuit algorithm.

In an example embodiment, the identified non-zero elements of the crosstalk coupling vector form a sparsity set that includes indices of the non-zero elements of the crosstalk coupling vector, and the method further includes determining whether the identified sparsity set has converged.

In an example embodiment, the determining whether the identified sparsity set has converged is based on a threshold number of measurements.

In an example embodiment, the determining the value of each identified non-zero element of the crosstalk coupling vector includes determining a least-squares matrix based on the pilot matrix and the non-zero elements, and determining the value of each identified non-zero element of the crosstalk coupling vector by applying the least-squares matrix to a corresponding determined measurement vector.

In an example embodiment, the determining the at least one pilot matrix includes identifying a plurality of groups, each group including a subset of the plurality of subcarriers, and determining a different pilot matrix for each of the plurality of groups. The obtaining the measurement vectors includes obtaining measurement vectors for the at least one first line associated with the plurality of groups, and combining the obtained measurement vectors for the at least one first line associated with the plurality of groups in order to determine the measurement vectors for the at least one first line on the plurality of subcarriers.

In an example embodiment, the method further includes identifying a plurality of groups, each group including a subset of the plurality of subcarriers, and performing the obtaining of at least one pilot matrix, the transmitting, the obtaining of the measurement vectors, the determining of the weighted vector, and the determining of the crosstalk coupling vector, simultaneously for each of the plurality of groups.

In an example embodiment, the method further includes applying pre-coder coefficients to the at least one first line based on the crosstalk coupling vector.

In one example embodiment, a device includes a processor configured to determine crosstalk for at least one first line in a communication system having a plurality of second lines, the processor being configured to determine the crosstalk by obtaining at least one pilot matrix representing a sequence of pilot signals, transmitting pilot signals across the plurality of second lines and the at least one first line in accordance with the at least one pilot matrix, obtaining measurement vectors for the at least one first line on a plurality of subcarriers, in response to the transmitted pilot signals, determining a weighted vector, the weighted vector being a weighted combination of the measurement vectors and determining a crosstalk coupling vector based on the determined weighted vector.

In an example embodiment, the processor is configured to determine the weighted vector by determining a noise variance of each of the plurality of subcarriers, and determining the weighted vector based on the determined noise variance of each of the plurality of subcarriers.

In an example embodiment, the processor is further configured to identify non-zero elements of the crosstalk coupling vector based on the determined weighted vector, and determine values of the identified non-zero elements of the crosstalk coupling vector.

In an example embodiment, the processor is configured to identify the non-zero elements of the crosstalk coupling vector using an orthogonal matching pursuit algorithm.

In an example embodiment, the identified non-zero elements of the crosstalk coupling vector form a sparsity set that includes indices of the non-zero elements of the crosstalk coupling vector, and the processor is configured to determine whether the identified sparsity set has converged.

In an example embodiment, the processor is configured to determine whether the sparsity set has converged based on a threshold number of measurements.

In an example embodiment, the processor is configured to determine the value of each identified non-zero element of the crosstalk coupling vector by determining a least-squares matrix based on the pilot matrix and the non-zero elements, and determining the value of each identified non-zero element of the crosstalk coupling vector by applying the least-squares matrix to a corresponding determined measurement vector.

In an example embodiment, the processor is configured to determine the at least one pilot matrix by identifying a plurality of groups, each group including a subset of the plurality of subcarriers, and determining a different pilot matrix for each of the plurality of groups. The processor is configured to obtain the measurement vectors by obtaining measurement vectors for the at least one first line associated with the plurality of groups, and combining the obtained measurement vectors for the at least one first line associated with the plurality of groups in order to determine the measurement vectors for the at least one first line on the plurality of subcarriers.

In an example embodiment, the processor is further configured to identify a plurality of groups, each group including a subset of the plurality of subcarriers, and perform the obtaining of at least one pilot matrix, the transmitting, the obtaining of the measurement vectors, the determining of the weighted vector, and the determining of the crosstalk coupling vector, simultaneously for each of the plurality of groups.

In an example embodiment, the processor is further configured to apply pre-coder coefficients to the at least one first line based on the crosstalk coupling vector.

BRIEF DESCRIPTION OF THE DRAWINGS

Example embodiments will become more appreciable through the description of the drawings, which are not limiting of example embodiments, in which:

FIG. 4 illustrates a method of initializing a joining line in a communication system having a plurality of current active lines using multiple pilot matrices, according to an example embodiment;

FIG. 5 illustrates an adaptive method of initializing a joining line in a communication system having a plurality of current active lines, according to an example embodiment; and FIG. 6 illustrates a method of initializing a joining line in a communication system having a plurality of current active lines based on two or more linear combination of subcarriers, according to an example embodiment.

DETAILED DESCRIPTION OF EXAMPLE EMBODIMENTS

Figure 1:
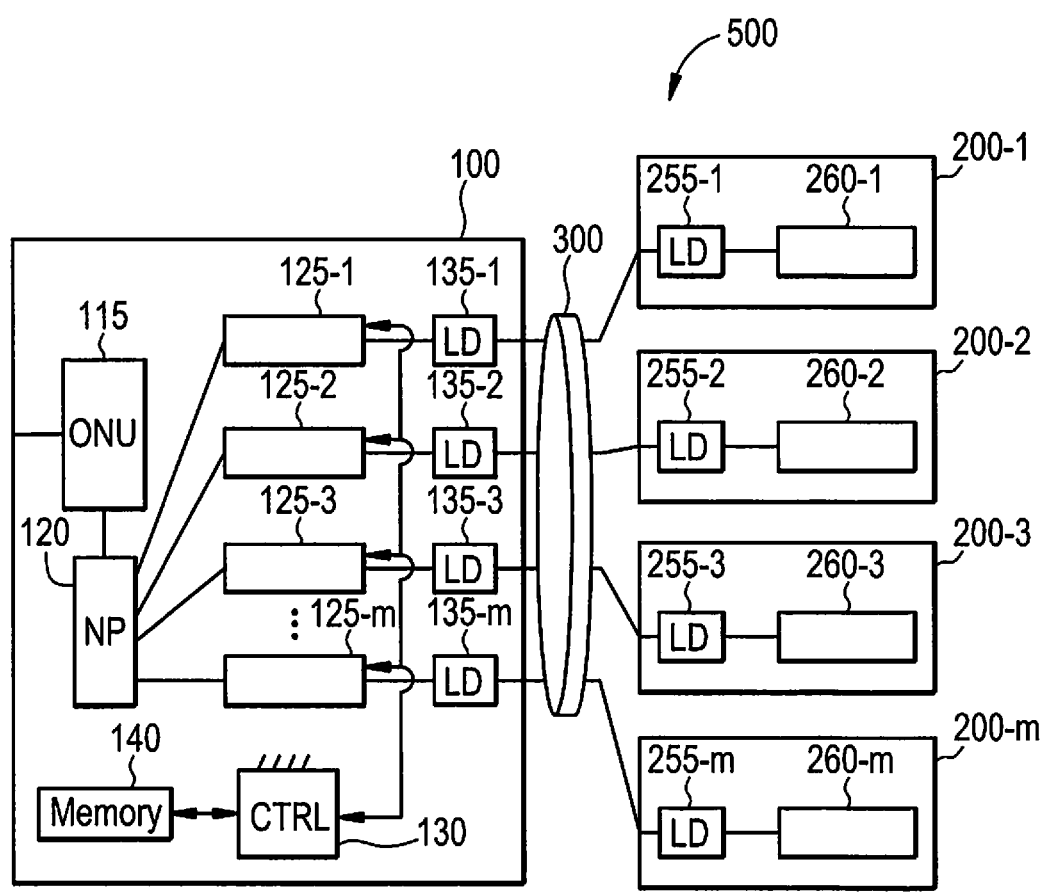
FIG. 1 illustrates a communication network according to an example embodiment.

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 illustrates a communication system according to an example embodiment. As shown in FIG. 1, the system 500 includes a distribution point or access node 100 and Customer Premises Equipment (CPEs) 200-1 to 200-M, where M may be an integer greater than 1.

The access node 100 may be under control of an operator. The access node 100 includes an optical network unit (ONU) 115 configured to communicate with a network processor (NP) 120. As is known, the ONU 115 provides a high-bandwidth data connection over a fiber optic channel to an optical line terminal (OLT) located in a central office. The ONU 115 passes received downstream data frames or packets to the NP 120, which then determines the destination for the frames or packets and accordingly forwards them to an appropriate interface (e.g., DSL, ADSL, VDSL, VDSL2, G.fast, etc. interface). Similarly, in the upstream direction, the NP 120 forwards frames or packets from the interfaces to the ONU 115.

The NP 120 provides signals to processing devices 125-1 to 125-M. The processing devices 125 are configured for point-to-point communication.

The access node 100 further includes a controller 130. The controller 130 is configured to receive signal data collectively referred to as a signal vector from the processing devices 125. The signal data may include signal values intended to be received by corresponding processing devices 260-1 to 260-M in the CPEs 200. In the downstream direction, the controller 130 is also configured to precode the signal vector, and send the resulting data back to the processing devices 125 for transmission to the CPEs 200. The processing devices 125 then send the precoded signal data over respective lines 300 via respective analog front ends (AFEs) 135-1 to 135-M. In the upstream direction, the processing devices 125 receive crosstalk-contaminated signals from the AFEs 135. The controller 130 receives the crosstalk-contaminated signals (collectively referred to as received signal vector) from the processing devices 125, postcodes the received signal vector, and provides the processing devices 125 with the post-compensated signal data. The processing devices 125 then continue to process the signal data to demodulate the intended upstream information.

Generally, the data exchanged between processing devices would be frequency-domain samples, but alternatively the data could be represented as time-domain samples, for example.

As discussed above, the controller 130 communicates with the processing devices 125. Alternatively, the controller 130 may be between the processing devices 125 and the respective AFEs 135-1 to 135-M. Thus, the location of the controller 130 is not limited to the location shown in FIG. 1.

Furthermore, it will be understood that the access node 100 may include a memory, or multiple memories. The NP 120, the controller 130, and/or the processing devices 125 execute programs and/or program modules stored on the memory to perform their respective functions and the functions of the access node 100. The operation of the access node 100 will be described in greater detail below with respect to some example embodiments. The memories may be external to and/or internal to the NP 120, the controller 130, and/or the AFEs 135. For the purposes of simplicity of illustration only, only a memory 140 associated with the controller 130 is shown.

As discussed above, each of the processing devices 125 may communicate with a respective one of the CPEs 200 over the communication lines 300 through an associated AFE 135. The lines 300 (also referred to as links) may be telephone lines (e.g., twisted copper pairs), and the CPEs 200-1 to 200-M may be modems or other interface devices operating according to a communication standard for transmitting data over telephone lines. The CPEs 200-1 to 200-M may be located in various customer premises. Each of the CPEs 200-1 to 200-M includes a AFE 255-1 to 255-M and respective processing devices 260-1 to 260-M. Each of the AFEs 255 may be the same or substantially the same as the AFEs 135.

The system 500 may utilize discrete multi-tone modulation (DMT). A DMT system uses a number of orthogonal subcarriers simultaneously. The number of pilot symbols may be reduced by using a joint estimation of a cross coupling vector v over multiple tones, using a technique referred to as frequency-dependent pilot sequences (FDPS).

G.vector also allows for frequency-dependent pilot sequences. However, the degree to which pilot length can be reduced using frequency-dependent pilot sequences depends on the characteristics of the crosstalk coupling coefficients as a function of frequency. Where impulse responses are shorter in the time domain, the channel coefficients will be smoother in the frequency domain. In non-ideal topologies, for example, where twisted pair lines may have a branching (bridge tap) structure subject to multi-path (e.g. echo) effects, the smoothness of channel coefficients in frequency can be reduced, limiting the effectiveness of multi-subcarrier estimation.

Whether using a baseline scheme or using frequency-dependent pilots, as the number of lines in the system grows, the time required for crosstalk estimation grows proportionally.

Example embodiments take advantage of the geometry of a system. More specifically, because of the geometry of the system, the crosstalk experienced by a joining line typically comes from only a portion of the active lines already in the system.

When collecting larger and larger groups of twisted pair lines for vectoring, using twisted pair cable types commonly in use, the number of lines providing significant crosstalk into a particular line does not grow without bound. Crosstalk may be considered significant if the crosstalk causes a significant reduction in information carrying capacity of the system, e.g., if the data rates, when a disturber line is active, are less than the data rates when the disturber line is inactive, by more than a threshold percent. As an example, crosstalk may be insignificant if it is lower in strength than other sources of noise in the system, such as thermal noise in receiver circuitry.

The lines providing crosstalk greater than a threshold (e.g., significant crosstalk) may be referred to as disturber lines. The number of disturber lines is limited by geometric considerations, since typically the crosstalk strength is related to the physical proximity in a binder, and only so many lines can be in close proximity to each other.

As a result, in a large system, the crosstalk coupling vector v is expected to be sparse, having a limited number of significant components whose positions in the cross coupling vector v are not know a priori.

According to example embodiments, the computation complexity of the system in identifying non-zero coefficients of a crosstalk coupling vector is significantly reduced by solving a single compressive sensing problem.

During an initialization process for the joining line, there may be N−1 active lines, such that after initialization, there are N active lines. As will be used throughout the description, a cross coupling vector v is a vector of length N and represents the channel coupling coefficients from each of the N lines into the N-th line, respectively. To facilitate the description of example embodiments, the cross coupling vector v may be considered as an N×1 column vector.

Figure 2:
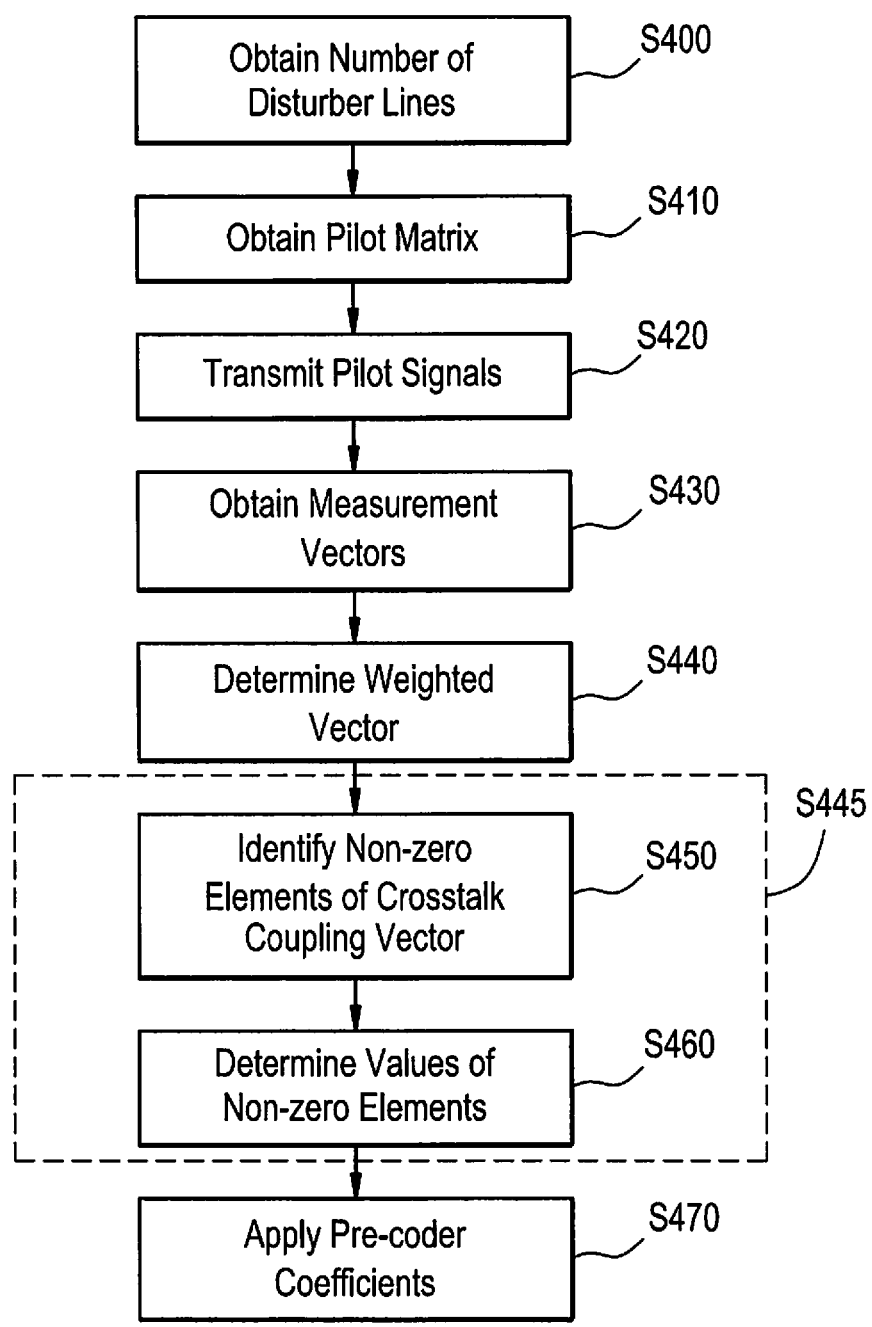
FIG. 2 illustrates a method of initializing a joining line in a communication system having a plurality of current active lines, according to an example embodiment.

FIG. 2 illustrates a method of initializing a joining line in a communication system having a plurality of current active lines, according to an example embodiment. For the purposes of description only, this embodiment will be described with respect to implementation on the system of FIG. 1. For example, three lines in FIG. 1 may be considered current active lines and a fourth line may be a joining line.

While the example embodiments will be described with respect to a joining line and a plurality of current active lines, example embodiments are not limited thereto. For example, a group of lines simultaneously join a vectored system such as the system 500 shown in FIG. 1, in which case the crosstalk from one or more of the joining lines on another one of the joining lines may also be estimated. Furthermore, crosstalk between current active lines may be estimated. Moreover, the crosstalk from the current active lines on another line may be estimated, where the other line had previously joined the system shown in FIG. 1, but has been in a power-saving operation mode for a period of time and is now returning to normal-power operation mode. Accordingly, terms such as "joining line" and "at least a first line" may refer to line(s) for which a crosstalk coupling vector is to be determined and terms such as "a plurality of active lines" and "a plurality of second lines" may refer to lines from which the crosstalk experienced by a joining line/at least a first line comes from.

At S400, the controller 130 obtains a threshold number of disturber lines D among the plurality of current active lines. The disturber lines D are a portion of the plurality of current active lines expected to provide crosstalk greater than a threshold.

The threshold number of disturber lines D is less than a number of the plurality of current active lines. The current active lines are lines that are handling communication sessions at the time the initialization of the joining line begins. The threshold number of disturber lines D may be determined before initialization. The threshold number of disturber lines D may be different from an actual number (or number of estimated disturber lines) d. The actual number of disturber lines d is not more than the threshold number of disturber lines D, but it could be less, depending on a stopping criteria.

The threshold number of disturber lines D may be determined based on (1) expert knowledge of the cables (a service provider may know that the copper cables in its network have a certain binder size, with little crosstalk between binders (then D is the binder size); (2) the maximum of the number of disturber lines affecting each of the active lines (these numbers are known since the active lines have had time to estimate crosstalk affecting them precisely); or (3) the number of disturber lines the joining line has experienced in the past (in previous communication sessions).

The number of disturber lines D may be based on geometric considerations and/or empirical data.

At S410, the controller 130 obtains the pilot matrix M. A pilot matrix M is a T×N pilot matrix, where T is a number of time slots for the crosstalk estimation and N is the number of current active lines plus the joining line. The pilot matrix M indicates the pilot values to be transmitted on each of the N lines at T different time slots. The term "slot" and "instance" may be used interchangeably. An example of a time slot may be a sync symbol.

The number of time instances T is less than N and is determined based on the number of disturber lines D. In one example embodiment, the controller 130 determines an approximate value of T as:

$$T=2D \quad (1)$$

The controller 130 may determine the number of time instances T as:

$$T=\text{ceiling}(\max(2D, 2 \log_2(N)+4)) \quad (2)$$

The log base 2 of N part of equation (2) is because in DSL, binary pilots (1 and −1) are used and T should allow for the columns of M to be unique with high probability if chosen at random. Moreover, T may be adjusted based on empirical data.

The controller 130 may determine the pilot matrix M using rows of a random Walsh-Hadamard matrix, for example.

The pilot sequences are assigned to each line based on the corresponding column of the pilot matrix M. As described above, M is a T×N matrix with N columns of length T. Each column is a pilot sequence. The controller 130 assigns a different pilot sequence/column to each of the N lines; the sequence tells the line what pilot value to send in each of the T time slots.

At S420, the controller 130 provides the pilot matrix M to the processing devices 125. The processing devices 125 then transmit pilot signals over the plurality of subcarriers in accordance with sequence of pilots identified in the pilot matrix M.

In one example embodiment, the system 500 is a discrete multi-tone modulation (DMT) system, which uses a number of orthogonal subcarriers simultaneously. Accordingly, the processing devices 125 may independently and in parallel transmit pilot signals on each subcarrier, in accordance with the pilot matrix M.

In one example embodiment, at S420, the controller 130 provides the pilot matrix M to the processing devices 125 and the processing devices 125 transmit pilot signals, over the plurality of subcarriers, across the plurality of current active lines as well as the joining line in accordance with sequence of pilots identified in the pilot matrix M.

At S430, the controller 130 obtains measurement vectors for the joining line on the plurality of subcarriers. In particular, the controller 130 obtains a measurement vector y(k) for all k in a set of subcarriers K. The vector y(k) is a T×1 column vector that represents the values received at a receiver of the joining line during the T time instances. These values are related to each other by the expression $$Y(k)=Mv(k)+z(k) \quad (3)$$

where a T×1 column vector z(k) represents measurement noise associated with the $k^{th}$ subcarrier.

In G. vector, vectors y(k) may be obtained as error feedback while sending pilot signals specified by the pilot matrix M.

At S440, the controller 130 determines a weighted vector y* that is a weighted combination of the measurement vectors y(k). In one example embodiment, for determining a weighted vector y*, the controller 130 obtains an estimate of variances $\sigma^2(k)$ of noise for each subcarrier k. The controller 130 may obtain the estimate of variances $\sigma^2(k)$ by sending additional pilot measurements across the active lines and the joining line. In one example embodiment, the controller 130 may obtain the estimate of the variances $\sigma^2(k)$ using a method described in the European Patent Application No. EP14305872.5, entitled *In-Service Estimation of Vectoring Performance Metrics*, the entire contents of which are hereby incorporated by reference. Alternatively, any other known methods for obtaining the estimate of variance $\sigma^2(k)$ for each subcarrier k, may be used.

Thereafter, the controller 130 determines a weight for each vector y(k) using the following formula:

$$w(k)=\|y(k)\|/\sigma^2(k) \quad (4)$$

where w(k) is a corresponding weight for each of the measurement vectors y(k).

Once the controller 130 determines the weights w(k), then the controller 130 determines the weighted vector y* as a linear combination of the measurement vectors y(k) multiplied by the corresponding weight w(k), using the following formula:

$$y^*=\Sigma_{k\in K}w(k)^*y(k) \quad (5)$$

Once the controller 130 determines the weighted vector y*, the controller 130 determines the crosstalk coupling vector v(k) for each subcarrier k at 5445.

In one example embodiment, the controller 130 determines the crosstalk coupling vector v(k) by identifying a common sparsity set S, which is a single set of non-zero elements that includes the non-zero elements of each of the crosstalk coupling vectors v(k), followed by determining the values of the identified non-zero elements of each vector v(k), both of which will be described below, with respect to S450 and S460 of FIG. 2.

At S450, the controller 130 identifies the common sparsity set S of the crosstalk coupling vectors v(k). In one example embodiment, in identifying the common sparsity set S of the crosstalk matrix v(k), the controller 130 applies an Orthogonal Matching Pursuit (OMP) algorithm to estimate a weighted crosstalk coupling vector v* as a D'-sparse vector, where D' may be an estimate of the number of disturber lines, consistent with the weighted vector y*. In one example embodiment, a D'-sparse vector v* approximately satisfies the equation y*=Mv*.

The controller 130 identifies the sparsity set S as the indices of the non-zero elements of the D'-sparsed crosstalk coupling vector v*. The applying of the OMP algorithm for estimating the D'-sparsed crosstalk coupling vector v* and associated sparsity set S, will now be described with reference to FIG. 3.

Figure 3:
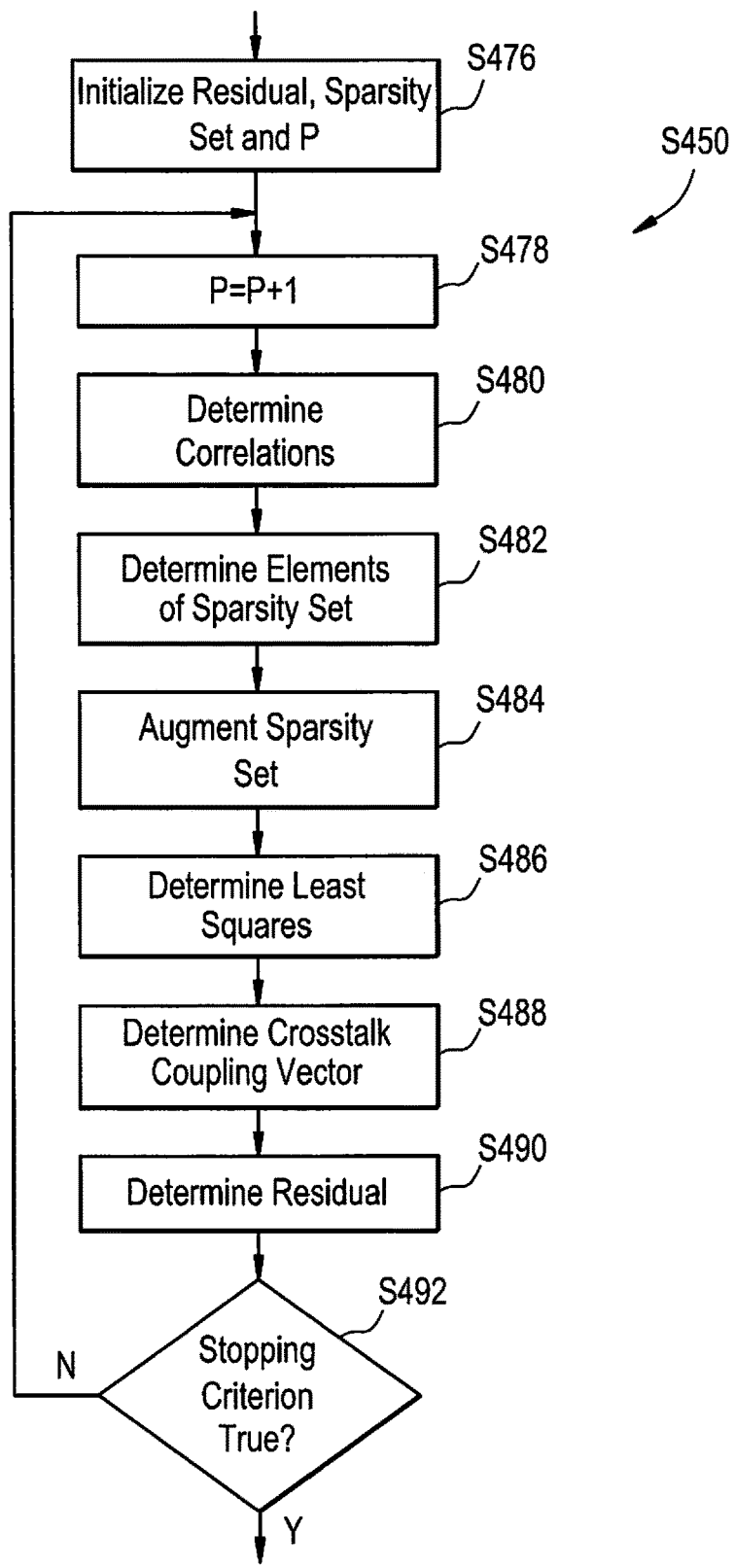
FIG. 3 illustrates an example embodiment of an orthogonal matching pursuit (OMP) algorithm.

FIG. 3 illustrates an example embodiment of an OMP algorithm implemented by the controller 130. In other words, FIG. 3 illustrates an example embodiment of S450. At step S450, instead of using the inputs y(k) for each tone, the input is a single vector y* together with the measurement matrix M. Using an OMP algorithm, the controller 130 is configured to determine crosstalk coupling vector $v^{*(p)}$, the sparsity set $S^{(p)}$ with a p number of iterations of the OMP algorithm, and a residual $r^{(p)}$.

As shown in FIG. 3, the controller 130 is configured as a special purpose machine to:

1. Initialize $r^{(0)}=y^*$, $S^{(0)}=\emptyset$, p=0, at S476.
2. Set p=p+1, at S478.
3. Compute for each index $i \notin S^{(p-1)}$, correlations $c_i^p=(\varphi_i, r^{(p-1)})$ where $\varphi_i$ is i-th column of the pilot matrix M, at S480.
4. Compute $s^p=\arg\max_i |c_i^p|$, at S482.
5. Augment the sparsity set S as $S^p=S^{(p-1)} \cup \{s^p\}$, at S484.
6. Solve a least squares problem $x^p=\arg\min_x \|y^*-MG^p x\|_2^2$, at S486, where x is an arbitrary N×1 complex vector on the right hand size of the equation. Then on the left $x^{(p)}$ is the N×1 complex vector that minimizes the expression on the right. $G^{(p)}$ is a diagonal, zero-one matrix, a set of diagonal elements equal to one is determined by the set $S^{(p)}$.
7. Compute the estimate of the D'-sparse crosstalk coupling vector $v^{*(p)}=G^{(p)}x^{(p)}$, at S488.
8. Compute the residual $r^{(p)}=y^*-Mv^{*(p)}$, at S490.

At S492, the controller 130 determines whether a stopping criterion is met. The stopping criterion may be a fixed number of iterations of the OMP algorithm (a maximum number of p), or may be a threshold $\epsilon$, greater than zero, where S478 to S490 are repeated until the residual $\|r^{(p)}\| \leq \epsilon$. The thresholds $\epsilon$ may be based on a noise level in the measurements vector y*. If the supporting criterion is met, the OMP algorithm is terminated, and the sparsity set S is identified as the last-computed sparsity set $S^{(p)}$. If the supporting criterion is not met, the controller 130 returns to S478.

Referring back to FIG. 2, once the OMP algorithm is terminated and the controller 130 identifies the sparsity set S of non-zero elements, the controller 130 determines the values of the identified non-zero elements of the crosstalk coupling vector v(k) at S460, as described below.

In one example embodiment, the controller 130 determines a pseudo-inverse matrix B, defined by the following formula:

$$B=(M_s^H M_s)^{-1} M_s^H \quad (6)$$

where $M_s$ has a T by D' dimension and is obtained from the columns of the pilot matrix M indexed by the sparsity set S.

Thereafter, for each subcarrier k, the controller 130 estimates entries of the crosstalk coupling vector v(k) that do not correspond to entries in the sparsity set S to be equal to 0. However, the controller 130 estimates entries of the crosstalk coupling vector v(k) that correspond to entries in the sparsity set S by multiplying the corresponding measurement vector y(k) by the pseudo-inverse matrix B, as given by equation (7) below.

$$\hat{v}(k)=A_S B y(k) \quad (7)$$

where $A_S$ is a matrix of dimension N by D', obtained from the columns of an N by N identity matrix indexed by the sparsity set S, and where $\hat{v}(k)$ is an estimate of the crosstalk coupling vector v(k).

At S470, the controller 130 uses the estimated crosstalk coupling vector $\hat{v}(k)$ as the crosstalk coupling vector v(k), from which the pre-coder coefficients to apply for protecting the joining line from crosstalk from the active lines may be derived, using known methods.

For example, the controller 130 sets pre-coder coefficients as follows:

$$P_{Nj}=-v_j, \text{ for each } j=1, \ldots, N-1 \quad (8)$$

where j is an index applies for every line from 1 to N and $P_{Nj}$ is the precoder coefficient for protecting line N from crosstalk from line j.

The controller 130 sends the pre-coded signal to the corresponding processing device 125.

Applying the method described above with reference to FIG. 2, enables a controller 130 to initialize and determine the crosstalk coupling vector for a joining line in a fast and accurate manner. In particular, the controller 130 determines a weighted combination of the measurement vectors to obtain one weighted vector, based on which the non-zero elements of the crosstalk coupling vector are identified. Using the weighted combination to identify the non-zero elements significantly reduces the computation complexity required to identify the non-zero elements compared to a scenario in which the method of FIG. 2 is applied to each subcarrier independently. The reduction in computation complexity may be proportional to the number of subcarriers. Furthermore, determining the appropriate weight for each measurement vector y(k) results in reducing the sensitivity of the determined crosstalk coupling vector to system noise.

In one example embodiment, instead of applying a single pilot matrix M to all subcarriers k, the controller 130 may apply different pilot matrices to different subsets of the subcarriers k. FIG. 4 illustrates a method of initializing a joining line in a communication system having a plurality of current active lines using multiple pilot matrices, according to an example embodiment.

According to FIG. 4, the controller 130 obtains the number of disturber lines at S500 in the same manner as described above with reference S400 of FIG. 2. Therefore, for the sake of brevity, S500 will not be described in greater detail.

At S510, the controller 130 obtains different pilot matrices for different subsets of the subcarriers k. For example, the controller 130 may obtain a pilot matrix $M_0$ for subcarriers with indices of the form 2k (k=0, 1, 2, 3 . . . ). Furthermore, the controller, may obtain a pilot matrix $M_1$ for subcarriers with indices of the form (2k+1) (k=0, 1, 2, 3 . . . ) in accordance with the pilot matrix $M_1$. In this example embodiment, the index k identifies a pair of consecutive subcarriers (2k, 2k+1), one from each of the two subsets.

While in this example embodiment, the controller 130 obtains pilot matrices $M_0$ and $M_1$, the inventive concepts are not limited to only two different pilot matrices. The controller 130 may divide the subcarriers into an arbitrary number of subsets and obtain a different pilot matrix for each subset of the subcarriers.

At S520, the controller 130 provides the obtained pilot matrices to the processing devices 125. The processing devices 125 then transmit pilot signals on each subset of subcarriers in accordance with the corresponding pilot matrix. In the example embodiment above, the controller 130 provides the pilot matrices $M_0$ and $M_1$ to the processing devices 125. The processing devices 125 then transmit pilot signals on subcarriers 2k in accordance with pilot matrix $M_0$ and transmit pilot signals on subcarrier (2k+1) in accordance with the pilot matrix $M_1$.

At S530, the controller 130 obtains measurement vectors for each subset of subcarriers. For example, the controller 130 obtains measurement vectors y(2k) and y(2k+1). In the example embodiment described above, the controller 130 may concatenate the measurement vectors y(2k) and y(2k+1) of length T on neighboring subcarriers to obtain a measurement vector y'(k) of length 2T for each of the subcarrier pairs 2k and 2k+1. Accordingly, y'(k) may have twice as many number of measurements as the measurement vector y(k) obtained using a single pilot matrix M. The controller 130 may also concatenate the T×N pilot matrices $M_0$ and $M_1$ to obtain the equivalent pilot matrix M of dimension (2T)×N.

Thereafter, at S540, the controller 130 determines the weighted vector y* in the same manner as described above with reference to S440 of FIG. 2. Therefore, for the sake of brevity, S540 will not be described in greater detail.

At S545, the controller 130 determines the crosstalk coupling vector v. The controller 130 may determines the crosstalk coupling vector as follows.

At S550, the controller 130 identifies the non-zero elements of the crosstalk coupling vector v'(k) from the measurements y'(k) in the same manner as described above with reference to S450 of FIG. 2. Therefore, for the sake of brevity, S550 will not be described in greater detail.

Thereafter, at S560, the controller 130 determines the values of the identified non-zero elements of the estimated crosstalk coupling vector v̂(k) corresponding to measurement vector y'(k) described above. The controller 130 determines the values of the identified non-zero elements of the estimated crosstalk coupling vector v̂(k) in the same manner as described above with reference to S460 of FIG. 2.

The controller 130 may then use the estimated crosstalk coupling vector v̂'(k) as the estimated crosstalk coupling vector on the two neighboring subcarriers 2k and 2k+1. That is, the controller may set v(2k)=v'(k), and v(2k+1)=v'(k). In an alternative embodiment, the controller 130 may perform an interpolation operation on the sequence of estimates v̂(k) in order to determine individual estimates v(2k) and v(2k+1) for each subcarrier.

Thereafter, at S570, the controller 130 uses the estimated crosstalk coupling vector v̂(k) to apply pre-coder coefficients for the joining line in the same manner as described above with reference to S470 of FIG. 2. Therefore, for the sake of brevity, S570 will not be described in greater detail.

One example advantage of obtaining measurement vectors using different pilot matrices for different subsets of the subcarrier is that the measurement vectors y(2k) and y(2k+1) may be received at the controller 130 twice as fast, where the reason for receiving the measurements twice as fast is due to two pilot matrices $M_0$ and $M_1$ being used. However, when a different number of pilot matrices is used (e.g., m different pilot matrices, with m being an integer equal to or greater than 3), then the speed at which the measurement vectors are received may be m-times as fast. Accordingly, the time it takes for the controller 130 to initialize and estimate the crosstalk from the current active lines onto the joining line may be further cut in half when two different pilot matrices are used (such time may be m-times faster, when using m different matrices, with m being an integer greater than or equal to 3). In one example embodiment, the value of m may not be made arbitrarily large and thus may not exceed a value beyond which crosstalk coefficients on the m consecutive subcarriers (mk, mk+1, . . . , mk+m−1) associated with index k are no longer similar.

In one example embodiment, the controller 130 may perform the process of FIG. 2 for determining the crosstalk coupling vector in an adaptive manner (e.g., when the size D of the sparsity set cannot be estimated in advance).

FIG. 5 illustrates an adaptive method of initializing a joining line in a communication system having a plurality of current active lines, according to an example embodiment.

According to FIG. 5, the controller 130 performs the steps S600 to S620 in the same manner as described above with reference to steps S400 to S420 of FIG. 2, respectively. Therefore, for the sake of brevity, S600 to S620 will not be described in greater detail.

At S630, the controller 130 obtains measurement vectors for after a threshold number of times. In one example embodiment, the controller may choose a set of potential stopping times $T_s$ to obtain measurements after the threshold number of times (e.g. $T_s=\{50, 60, 70, 80, \ldots\}$). In one example embodiment, the set of stopping times $T_s$ are chosen such that each threshold is a multiple of ten measurements greater than or equal to 50.

Once the controller 130 obtains the measurement vectors at time in the set $T_s$, the controller 130 determines a weighted vector y* of the obtained measurement vectors at S640 in the same manner as described above with reference to S440 of FIG. 2. Therefore, for the sake of brevity, S640 will not be described in greater detail.

At S645, the controller 130 determines the crosstalk coupling vector v. In one example embodiment, the controller 130 determines the crosstalk coupling vector v(k) as follows.

At S650, the controller identifies the non-zero elements of the crosstalk coupling vector at S650 (i.e., identifies the sparsity set S) in the same manner as described above with reference to S450 of FIG. 2. Therefore, for the sake of brevity, S650 will not be described in greater detail.

Thereafter, at S655, the controller 130 determines whether the identification of the non-zero elements of the crosstalk coupling vector (identification of the sparsity set S) in the last j stopping times has converged. For example, the controller 130 determines whether the sparsity sets S obtained using the last j stopping times (e.g., last two or three stopping times in the set $T_s$) are the same.

If at S655, the controller 130 determines that the sparsity set S has not converged, then the process reverts back to S600 and the controller 130 repeats S600 to S655.

If at S655, the controller 130 determines that the sparsity set S has converged, the process proceeds to S660. At S660, the controller 130 determines the values of the identified non-zero elements of the crosstalk coupling vector v(k) in the same manner as described above with reference to S460 of FIG. 2. Therefore, for the sake of brevity, S660 will not be described in greater detail.

Thereafter, at S670, the controller 130 uses the determined crosstalk coupling vector v(k) to apply pre-coder coefficients for the joining line in the same manner as described above with reference to S470 of FIG. 2. Therefore, for the sake of brevity, S670 will not be described in greater detail.

In example embodiments described above with reference to FIG. 2, the controller 130 determines the weighted vector y* by forming a single linear combination of the measurement vectors y(k). In another example embodiment, the controller 130 may form L different linear combinations of the subcarriers k, to obtain L different weighted vectors with a shared sparsity set S.

FIG. 6 illustrates a method of initializing a joining line in a communication system having a plurality of current active lines based on two or more linear combination of subcarriers, according to an example embodiment. According to FIG. 6, the controller 130 performs the steps S700 to S730 in the same manner as described above with reference to steps S400 to S430 of FIG. 2, respectively. Therefore, for the sake of brevity, S700 to S730 will not be described in greater detail.

At S740, the controller 130 determines L different weighted vectors y*, where L is an integer greater than 1. In one example embodiment, the controller determines L different linear combinations of the subcarriers k and based on the L different linear combinations of the subcarriers k, determines L different weighted vectors y* with a shared sparsity set S.

Thereafter, at S745, the controller 130 determines the crosstalk coupling vector v. In determining the crosstalk coupling vector v, the controller 130 applies the OMP algorithm simultaneously to the L different linear combinations at S750 to identifying the non-zero elements of the crosstalk coupling vector v(k) (determine the sparsity set S). The simultaneous application of the OMP algorithm may be referred to as the simultaneous orthogonal matching pursuit (SOMP) algorithm. The controller 130 applies the OMP algorithm to the L different linear combinations for identifying the non-zero elements of the crosstalk coupling vector, in the same manner as described above with reference to S450 of FIG. 2. Therefore, for the sake of brevity, S750 will not be described in greater detail.

Thereafter, at S760, the controller 130 determines the values of the identified non-zero elements of the crosstalk coupling vector v(k) in the same manner as described above with reference to S460 of FIG. 2. Therefore, for the sake of brevity, S760 will not be described in greater detail.

Thereafter, at S770, the controller 130 uses the determined crosstalk coupling vector v(k) to apply pre-coder coefficients for the joining line in the same manner as described above with reference to S470 of FIG. 2. Therefore, for the sake of brevity, S670 will not be described in greater detail.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A method of determining crosstalk for at least one first line in a communication system having a plurality of second lines, the method comprising:
obtaining at least one pilot matrix representing a sequence of pilot signals;
transmitting pilot signals across the plurality of second lines in accordance with the at least one pilot matrix;
obtaining measurement vectors for the at least one first line on a plurality of subcarriers, in response to the transmitted pilot signals;
determining a weighted vector, the weighted vector being a weighted combination of the measurement vectors; and
determining a crosstalk coupling vector based on the determined weighted vector.

2. The method of claim 1, wherein the determining the weighted vector includes,
determining a noise variance of each of the plurality of subcarriers, and
determining the weighted vector based on the determined noise variance of each of the plurality of subcarriers.

3. The method of claim 1, further comprising:
identifying non-zero elements of the crosstalk coupling vector based on the determined weighted vector, wherein
the determining the crosstalk coupling vector determines a value of each of the identified non-zero elements of the crosstalk coupling vector.

4. The method of claim 3, wherein the identifying identifies the non-zero elements of the crosstalk coupling vector using an orthogonal matching pursuit algorithm.

5. The method of claim 4, wherein
the identified non-zero elements of the crosstalk coupling vector form a sparsity set that includes indices of the non-zero elements of the crosstalk coupling vector, and
the method further comprises:
determining whether the sparsity set has converged.

6. The method of claim 5, wherein the determining whether the sparsity set has converged is based on a threshold number of measurements.

7. The method of claim 3, wherein the determining the value of each identified non-zero element of the crosstalk coupling vector includes,
determining a least-squares matrix based on the pilot matrix and the non-zero elements, and
determining the value of each identified non-zero element of the crosstalk coupling vector by applying the least-squares matrix to a corresponding determined measurement vector.

8. The method of claim 1, wherein the determining the at least one pilot matrix includes,
identifying a plurality of groups, each group including a subset of the plurality of subcarriers, and
determining a different pilot matrix for each of the plurality of groups, wherein the obtaining the measurement vectors includes,
obtaining measurement vectors for the at least one first line associated with the plurality of groups, and
combining the obtained measurement vectors for the at least one first line associated with the plurality of groups in order to determine the measurement vectors for the at least one first line on the plurality of sub carriers.

9. The method of claim 1, further comprising:
identifying a plurality of groups, each group including a subset of the plurality of subcarriers, and
performing the obtaining of at least one pilot matrix, the transmitting, the obtaining of the measurement vectors, the determining of the weighted vector, and the determining of the crosstalk coupling vector, simultaneously for each of the plurality of groups.

10. The method of claim 1, further comprising:
applying pre-coder coefficients to the at least one first line based on the crosstalk coupling vector.

11. A device comprising:
a processor configured to determine crosstalk for at least one first line in a communication system having a plurality of second lines, the processor being configured to determine the crosstalk by,
obtaining at least one pilot matrix representing a sequence of pilot signals;

transmitting pilot signals across the plurality of second lines and the at least one first line in accordance with the at least one pilot matrix;

obtaining measurement vectors for the at least one first line on a plurality of subcarriers, in response to the transmitted pilot signals;

determining a weighted vector, the weighted vector being a weighted combination of the measurement vectors; and determining a crosstalk coupling vector based on the determined weighted vector.

12. The device of claim 11, wherein the processor is configured to determine the weighted vector by, determining a noise variance of each of the plurality of subcarriers, and determining the weighted vector based on the determined noise variance of each of the plurality of subcarriers.

13. The device of claim 11, wherein the processor is further configured to, identify non-zero elements of the crosstalk coupling vector based on the determined weighted vector, and determine a value of each of the identified non-zero elements of the crosstalk coupling vector.

14. The device of claim 13, wherein the processor is configured to identify the non-zero elements of the crosstalk coupling vector using an orthogonal matching pursuit algorithm.

15. The device of claim 14, wherein the identified non-zero elements of the crosstalk coupling vector form a sparsity set that includes indices of the non-zero elements of the crosstalk coupling vector, and the processor is configured to determine whether the sparsity set has converged.

16. The device of claim 15, wherein the processor is configured to determine whether the sparsity set has converged based on a threshold number of measurements.

17. The device of claim 13, wherein the processor is configured to determine the value of each identified non-zero element of the crosstalk coupling vector by, determining a least-squares matrix based on the pilot matrix and the non-zero elements, and determining the value of each identified non-zero element of the crosstalk coupling vector by applying the least-squares matrix to a corresponding determined measurement vector.

18. The device of claim 11, wherein the processor is configured to determine the at least one pilot matrix by, identifying a plurality of groups, each group including a subset of the plurality of subcarriers, and determining a different pilot matrix for each of the plurality of groups, wherein the processor is configured to obtain the measurement vectors by, obtaining measurement vectors for the at least one first line associated with the plurality of groups, and combining the obtained measurement vectors for the at least one first line associated with the plurality of groups in order to determine the measurement vectors for the at least one first line on the plurality of subcarriers.

19. The device of claim 11, wherein the processor is further configured to, identify a plurality of groups, each group including a subset of the plurality of subcarriers, and perform the obtaining of at least one pilot matrix, the transmitting, the obtaining of the measurement vectors, the determining of the weighted vector, and the determining of the crosstalk coupling vector, simultaneously for each of the plurality of groups.

20. The device of claim 11, wherein the processor is further configured to apply pre-coder coefficients to the at least one first line based on the crosstalk coupling vector.

* * * * *